US008773386B2

(12) United States Patent
Wilson et al.

(10) Patent No.: US 8,773,386 B2
(45) Date of Patent: Jul. 8, 2014

(54) METHODS AND APPARATUS TO SCAN A TARGETED PORTION OF AN INPUT DEVICE TO DETECT A PRESENCE

(71) Applicant: Cypress Semiconductor Corporation, San Jose, CA (US)

(72) Inventors: Cole Wilson, Everett, WA (US); David G. Wright, San Diego, CA (US); Edward Grivna, Brooklyn Park, MN (US)

(73) Assignee: Cypress Semiconductor Corporation, San Jose, CA (US)

( * ) Notice: Subject to any disclaimer, the term of this patent is extended or adjusted under 35 U.S.C. 154(b) by 112 days.

(21) Appl. No.: 13/631,600

(22) Filed: Sep. 28, 2012

(65) Prior Publication Data

US 2014/0043251 A1     Feb. 13, 2014

Related U.S. Application Data

(60) Provisional application No. 61/681,249, filed on Aug. 9, 2012.

(51) Int. Cl.
*G06F 3/041* (2006.01)
(52) U.S. Cl.
USPC ........................................................ 345/173
(58) Field of Classification Search
CPC ..... G06F 3/041; G06F 3/0412; G06F 3/0418; G06F 3/044; G06F 2203/041; G06F 2203/04101; G06F 2203/04106; G06F 2203/04108; G06F 2203/04104
USPC ...................... 345/173–184; 178/18.01–20.04
See application file for complete search history.

(56) References Cited

U.S. PATENT DOCUMENTS

| 4,686,332 | A | 8/1987 | Greanias et al. |
| 5,149,919 | A | 9/1992 | Greanias et al. |
| 2007/0018966 | A1* | 1/2007 | Blythe et al. .................. 345/173 |
| 2007/0052692 | A1 | 3/2007 | Gruhlke et al. |
| 2008/0158167 | A1* | 7/2008 | Hotelling et al. .............. 345/173 |
| 2009/0273572 | A1* | 11/2009 | Edwards et al. .............. 345/173 |
| 2010/0155153 | A1 | 6/2010 | Zachut |
| 2011/0057670 | A1* | 3/2011 | Jordan .......................... 324/679 |
| 2011/0157068 | A1* | 6/2011 | Parker et al. .................. 345/174 |
| 2011/0157069 | A1 | 6/2011 | Zhuang et al. |
| 2011/0181552 | A1 | 7/2011 | Goertz et al. |
| 2011/0304577 | A1* | 12/2011 | Brown et al. ................. 345/174 |
| 2011/0310040 | A1* | 12/2011 | Ben-Shalom et al. ........ 345/173 |
| 2012/0044201 | A1 | 2/2012 | Xiaoping |
| 2012/0050221 | A1 | 3/2012 | Kolokowsky et al. |

(Continued)

OTHER PUBLICATIONS

3D Stylus and Pressure Sensing System for Capacitive Touch Panel, Chih-Lung Lin et al., filed on Aug. 24, 2012; 1 page.

(Continued)

*Primary Examiner* — Liliana Cerullo

(57) ABSTRACT

A method and apparatus perform a first scan of an input device and determine that a first signal profile received through the first scan is outside a range of a reference signal profile. The method and apparatus perform a second scan of the input device responsive to the first signal profile being outside the range of the reference signal profile and use a second signal profile received through the second scan to detect a presence of an input object at least proximate to the input device.

20 Claims, 11 Drawing Sheets

(56) References Cited

U.S. PATENT DOCUMENTS

2012/0068964 A1 3/2012 Wright et al.
2012/0105362 A1 5/2012 Kremin et al.
2012/0287077 A1* 11/2012 Pant et al. .................... 345/174

OTHER PUBLICATIONS

International Search Report for International Application No. PCT/US12/71228 dated Mar. 4, 2013; 2 pages.
Precision Handwriting, just like a high-quality II-point pen! Cregle Inc. Aug. 24, 2012; 2 pages.
TrueTouch Gen4 Offers Peerless Noise Immunity, SNR, Refresh Rate, Power Consumption. Cypress Semiconductor Aug. 24, 2012; 2 pages.
Written Opinion of the International Searching Authority for International Application No. PCT/US12/71228 dated Mar. 4, 2013; 6 pages.

* cited by examiner

METHODS AND APPARATUS TO SCAN A TARGETED PORTION OF AN INPUT DEVICE TO DETECT A PRESENCE

RELATED APPLICATIONS

This application claims the priority benefit of U.S. Provisional Application No. 61/681,249, filed Aug. 9, 2012, which is incorporated herein by reference in its entirety.

TECHNICAL FIELD

The subject matter relates to the field of interpreting user input. More specifically, but not by way of limitation, the subject matter discloses techniques for detecting a presence of an input object.

BACKGROUND

Computing devices, such as notebook computers, personal digital assistants, mobile communication devices, portable entertainment devices (e.g., handheld video game devices, multimedia players), and set-top-boxes (e.g., digital cable boxes, digital video disc (DVD) players) may include user interface devices that facilitate interaction between a user and the computing device.

One type of user interface device that has become more common operates by way of capacitance sensing. A capacitance sensing system may include a touchscreen, touch-sensor pad, a touch-sensor slider, or touch-sensor buttons, and may include an array of one or more capacitive sensor elements. Capacitive sensing typically involves measuring, through sensor signals, a change in capacitance associated with the capacitive sensor elements to determine a presence of a conductive object relative to the capacitive sensor elements. The measured changes in capacitance may be used to calculate a position of the conductive object. The input object may be, for example, a stylus or a user's finger. When multiple input objects are proximate to the capacitive sensor elements, the sensor signals resulting from each input object may be difficult to distinguish from one another.

BRIEF DESCRIPTION OF THE DRAWINGS

Some embodiments are illustrated by way of example and not limitation in the figures of the accompanying drawings in which.

DETAILED DESCRIPTION

Figure 1:
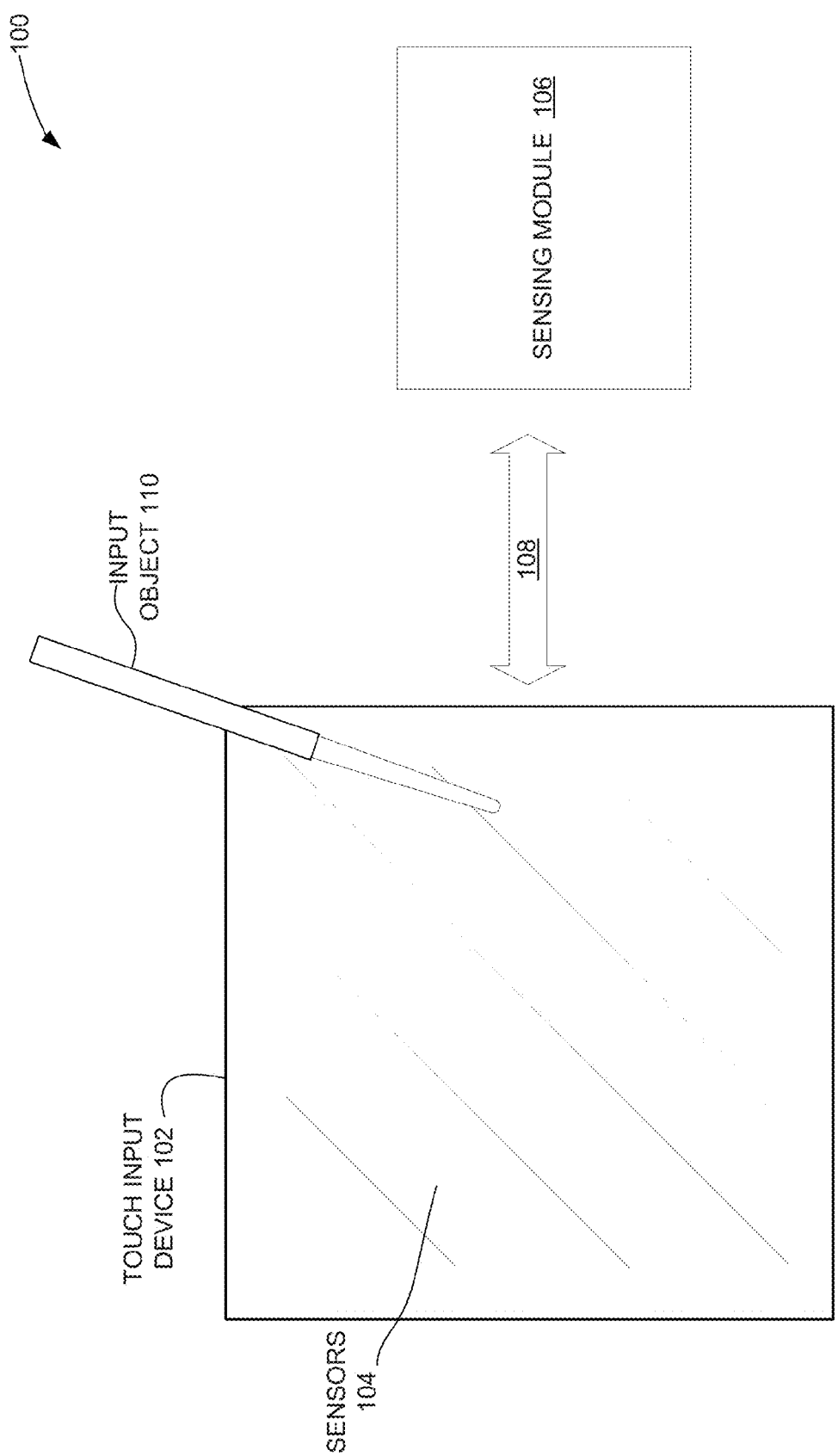
FIG. 1 is a block diagram illustrating an example sensing system, in accordance with various embodiments.

Methods and apparatus to scan a targeted portion of an input device to detect a presence are discussed. In the following description, for purposes of explanation, numerous examples are set forth in order to provide a thorough understanding of embodiments. It will be evident to one skilled in the art that the claimed subject matter may be practiced in other embodiments.

The detailed description discloses examples of technology that, among other things, defines and scans a targeted portion of an input device to detect presence of an input object. Some embodiments are now briefly introduced and then discussed in more detail along with other embodiments beginning with FIG. 1.

Use cases for a stylus and touch input device (e.g., a mobile phone, tablet, touch pad, or other touch input device) include a user gripping the touch input surface with a hand to hold the touch input device while providing touch input with the stylus. The user may also place a palm or other body part on the touch input surface while providing touch input with the stylus. The touch made by the hand grip or the palm can result in a signal that causes a presence of the stylus to go undetected, when it is the presence and position of the stylus that are of interest.

Through the embodiments described herein, a stylus having a relatively small diameter (e.g., 1-mm diameter) can be detected on a touch panel when one or more fingers having relatively larger diameter or surface area are simultaneously present on the touch panel.

A full panel balanced axial scan is described through which a small diameter stylus can be reliably detected and its location accurately resolved. In some use cases it can be difficult to detect and resolve the location of a stylus in both the X and Y axes through the full panel balanced axial scan. The embodiments herein describe defining a targeted portion of the touch panel to be scanned to detect and resolve the location of the stylus in one or both of the X and Y axes missed by the full panel axial scan. Various mutual capacitance scan modes described herein can be used to scan the targeted portion. A relationship between signal to noise ratio versus gain (e.g., integration time) can automatically be determined based on the signal resulting from the scan of the targeted portion. In an embodiment, integration time can be dynamically adjusted to meet a signal to noise ratio that is appropriate for an application, a user preference, a stylus diameter, a speed of stylus movement, and/or a target refresh rate.

In an embodiment, once a position of the stylus has been determined, subsequent targeted portions or areas of the touch panel can be determined based on predicted positions of the stylus. These subsequent targeted portions can be scanned to accurately track the position of the stylus, rather than using the full panel balanced axial scan, which as noted above, can be problematic for stylus detection and resolution of its location in some use cases.

Thus, even when a relatively large finger is applied to a touch panel, a relatively small stylus can be detected and located in multiple axes without a need to increase the number of touch panel sensors and pins to a touch controller, which would result in an increase in manufacturing costs, footprint, and consumption of processing resources.

The detailed description below includes references to the accompanying drawings, which form a part of the detailed description. The drawings show illustrations in accordance with embodiments. These embodiments, which are also referred to herein as "examples," are described in enough detail to enable those skilled in the art to practice embodiments of the claimed subject matter. The embodiments may be combined, other embodiments may be utilized, or structural, logical, and electrical changes may be made without departing from the scope of what is claimed. The following detailed description is, therefore, not to be taken in a limiting sense, and the scope is defined by the appended claims and their equivalents.

FIG. 1 is a block diagram illustrating a sensing system 100, in accordance with various embodiments. The sensing system 100 includes a touch input device 102 coupled with a sensing module 106. The touch input device 102 receives input from a user through an input object 110 (e.g., a stylus, a finger, or any other object used to provide input). The touch input device 102 may include a touch pad, a touchscreen, or any touch interface. In various embodiments, the sensing system 100 may provide the functionality of a touchscreen, a touchpad, a slider, a button, a switch, a level sensor, a proximity sensor, a displacement sensor, a combination thereof, or provide some other functionality based on a detection of a user input.

The touch input device 102 includes sensors 104. In various example embodiments, the sensors 104 may include one or more of light-sensitive elements, light emitting elements, photo-sensitive elements, pressure sensitive elements, and/or capacitive sensor elements. In some embodiments, the sensors 104 are embedded into an image display of the touch input device 102. This is sometimes referred to as in-cell sensing. For example, a photosensitive element may be embedded into each display pixel of the image display. The photosensitive elements sense light reflected by an input object back into the cell.

The input object 110 is shown to be proximate to or in contact with the touch input device 102 and is used to provide input to the touch input device 102. In this example, the input object 110 is a stylus. In an embodiment, the diameter of the stylus is around 1-mm, which is considerably less than the diameter of a typical finger. The input object 110 may be a non-conductive object, a conductive object, and/or may produce light or other energy to be sensed through the sensors 104, without departing from the claimed subject matter. In an embodiment, the input object 110 is passive meaning that it is not electrically powered to provide input to the touch input device 102. Alternatively or additionally, the input object 110 may be active meaning that it is electrically powered to provide input to the touch input device 102. The input object 110 may be fixed in position or moveable in position relative to the touch input device 102. For example, a user may move the input object 110 relative to the touch input device 102. The user may include a human, a mechanism, a machine, and/or programmed instructions. Alternatively or additionally, the touch input device 102 may be allowed to move relative to a fixed or movable input object 110.

The sensing module 106 senses or detects, using the sensors 104, a presence of one or more input objects proximate or in contact with one or more of the sensors 104 of the touch input device 102. The sensing module 106 may perform operations to sense, using the sensors 104, signals indicating the presence of the one or more input objects (e.g., the input object 110). Depending on the type of sensors used and what properties they sense, a sensor signal may indicate a pressure applied to the touch input device 102, light (e.g., infrared light) associated with an input object, an image associated with an input object, a capacitance of the sensors 104 and/or a change in capacitance of one or more of the sensors 104 when an input object is proximate to or in contact with the touch input device 102. The transmission media 108 may include any medium appropriate for the scan operation and through which the sensor signals may be conveyed. For some embodiments, the transmission media 108 includes metal traces (e.g., copper wire) coupled to the sensors. An example touch input device and the arrangement of its sensor elements are now discussed with respect to FIG. 2.

Figure 2:
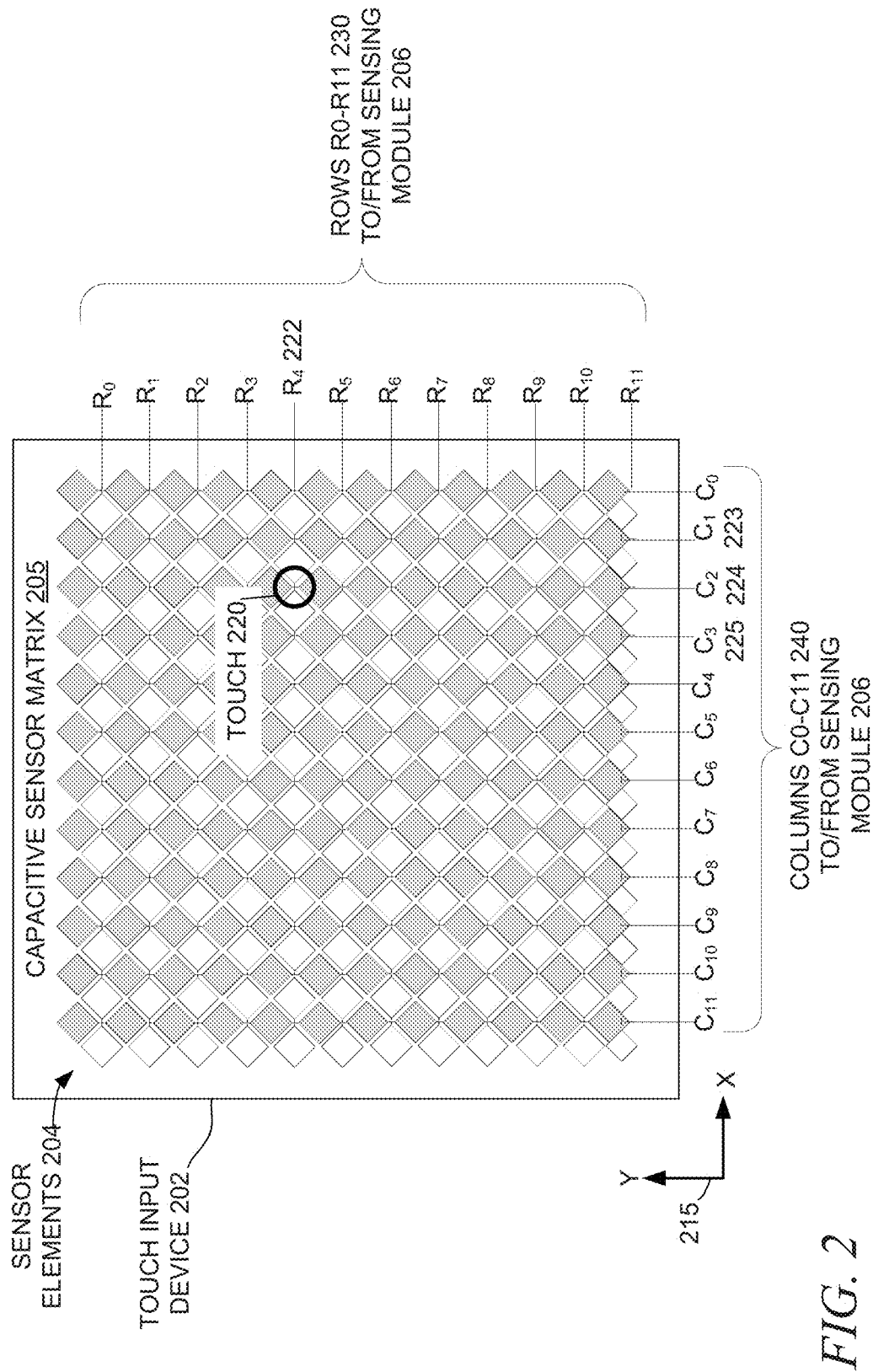
FIG. 2 is a block diagram illustrating a touch input device including a capacitive sensor matrix, in accordance with various embodiments.

FIG. 2 is a block diagram illustrating a touch input device 202 including a capacitive sensor matrix 205, in accordance with various embodiments. FIG. 2 includes rows $R_0$-$R_{11}$ 230 and d columns $C_0$-$C_{11}$ 240 of sensor elements 204 arranged in a matrix. The rows $R_0$-$R_{11}$ 230 and the columns $C_0$-$C_{11}$ 240 of sensor elements 204 are shown to be coupled with the sensing module 206. In scan operations described in more detail below, each of the rows $R_0$-$R_{11}$ 230 and each of the columns $C_0$-$C_{11}$ 240 of sensor elements may operate as both transmit and receive electrodes.

In the capacitive sensor matrix 205, each of the rows $R_0$-$R_{11}$ 230 of the sensor elements 204 is shown to cross with each of the columns $C_0$-$C_{11}$ 240 of the sensor elements 204. In an embodiment, galvanic isolation is maintained between the rows $R_0$-$R_{11}$ 230 and the columns $C_0$-$C_{11}$ 240. In an embodiment, each of the columns $C_0$-$C_{11}$ 240 may be associated with an X-coordinate of the X-Y plane 215 and each of the rows $R_0$-$R_{11}$ 230 may be associated with a Y-coordinate of the X-Y plane 215.

Although the sensor elements 204 are shown to be diamond shaped, one or more of the sensor elements 204 may be formed of other shapes (e.g., lines, triangles, snowflakes, and/or any other shape) and be organized in various other patterns (e.g., intersections, concentric circles, saw tooth pattern, Manhattan pattern, and/or other patterns) without departing from the claimed subject matter. The sensor elements 204 may comprise all or a portion of the surface area of the touch input device 202. The sensor elements 204 and patterns of the sensor elements 204 may be formed through one or more layers of the touch input device 202.

A touch 220 is shown relative to the sensor elements 204 where a conductive object is placed relative touch input device 202. As will be discussed below beginning with FIG. 3, the sensing module 206 may operate in one or more scan modes and/or scan one or more portions of the capacitive sensor matrix 205 for sensor signals that reflect changes in capacitance is response to touch input such as the touch 220.

Figure 3:
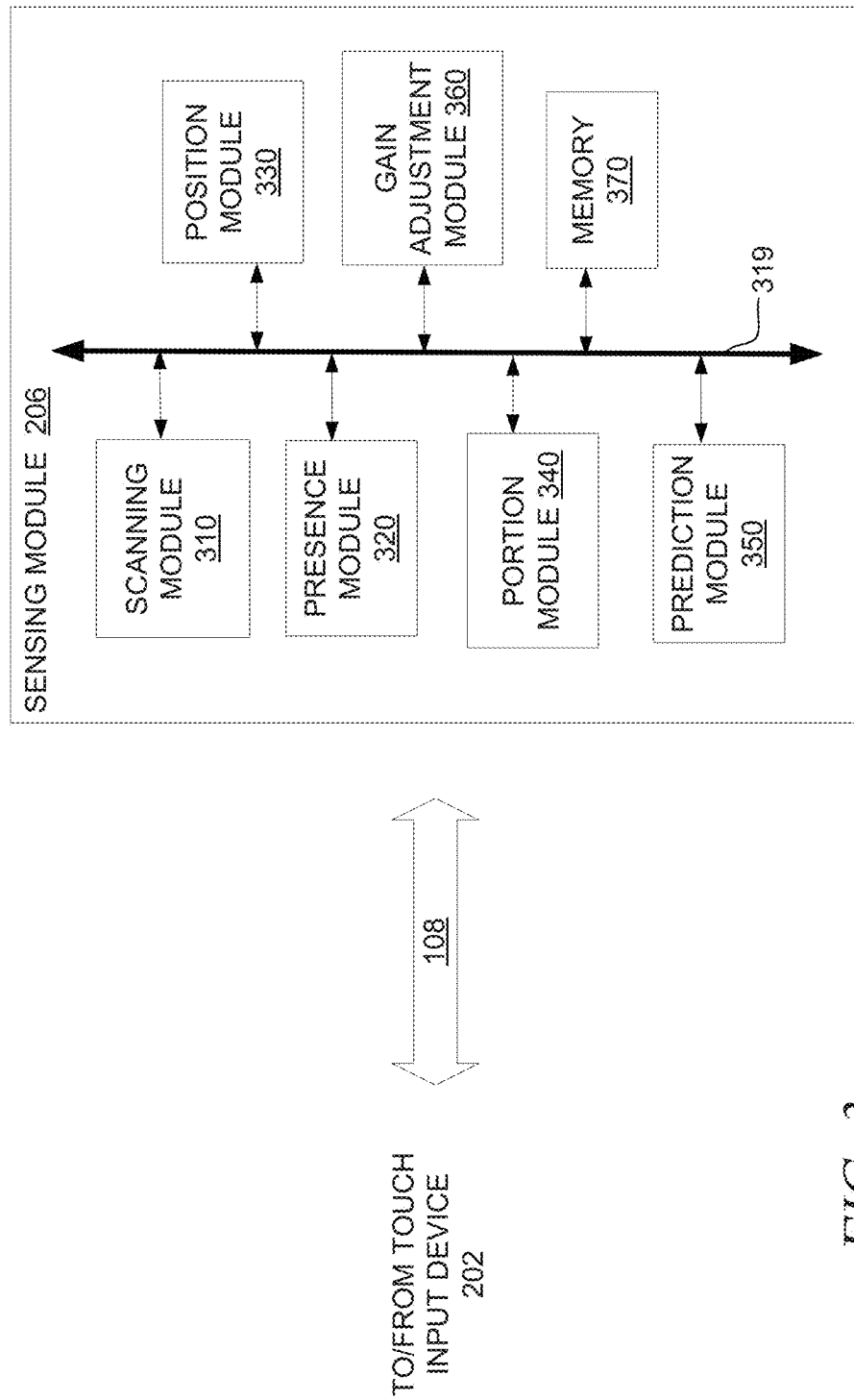
FIG. 3 is a block diagram illustrating a sensing module, in accordance with embodiments.

FIG. 3 is a block diagram illustrating a sensing module 206 of FIG. 2, in accordance with embodiments. The sensing module 206 includes a scanning module 310, a gain adjustment module 360, a presence module 320, a position module 330, a portion module 340, a prediction module 350, and a memory 370 coupled to one another through a bus 319, any of which may be implemented using hardware, software, or a combination of hardware and software.

In an embodiment, the scanning module 310 scans the sensors elements 204 of the touch input device 202 for sensor signals and the presence module can determine, based on the sensor signals whether a conductive object is proximate to or in contact with the touch input device 202. When the presence module 320 detects the presence of a conductive object, the position module 330 may evaluate a representation of the detected presence to determine a position of the conductive object. In an example scan operation, the scanning module 310 excites one or more of the sensor elements 204 and then receives, from the same or other of the sensor elements 204, a sensor signal that reflects a capacitance associated with the excited one or more sensor elements 204 and associated touch object. The scanning module 310 may include an analog-to-digital converter (not shown) to convert the sensor signal, which in this embodiment are analog capacitance values, to a digital representation of capacitance value. The presence module 320 can then detect presence of a conductive object if, for example, the digital capacitance value meets a threshold equivalent capacitance or falls within upper and lower threshold levels.

The sensor signal may reflect a self-capacitance between one or more of the sensor elements 204 and a ground reference (not shown). For example, the scanning module 310 may excite (e.g., apply a signal to) a transmit electrode (e.g., the row $R_4$ 222 of FIG. 2) and then receive a sensor signal through a receive electrode (e.g., the row $R_4$ 222) that represents the self capacitance between the row $R_4$ 222 and the ground reference. In an embodiment, the presence module 320 can detect the presence of the touch 220 through row $R_4$ 222, based on a difference between the measured self-capacitance when the touch 220 is not present and the measured self-capacitance when the touch 220 is present. This is an example of an axial scan mode in which a sensor signal of each scanned electrode can indicate presence of an input object relative to that electrode but does not indicate where along the electrode the presence is located.

The sensor signal that reflects the capacitance, introduced above and coupled to ground, may reflect a mutual capacitance between two or more of the sensor elements 204. Referring again to FIG. 2, the scanning module 310 may excite a transmit electrode (e.g., row $R_4$ 222) and then receive a sensor signal through a receive electrode (e.g., column $C_2$ 224) that represents a mutual capacitance between the sensor electrodes at the intersection of the transmit channel (e.g., row $R_4$ 222) and the receive channel electrode (e.g., column $C_2$ 224). The presence module 320 can detect the presence of the touch 220 based on the measured mutual capacitance when the touch 220 is not present and the measured mutual capacitance when the touch 220 is present. This is an example of an all points addressable scan mode in which the change in mutual capacitance of each scanned transmit-receive electrode intersection can indicate presence at that intersection.

In an embodiment, the scanning module 310 can operate in an axial scan mode through sensing mutual capacitance between transmit-receive electrode intersections. Referring to FIG. 2, for example, the scanning module 310 can simultaneously excite multiple transmit electrodes (e.g., rows $R_0$-$R_{11}$ 230) and then receive a sensor signal through a receive electrode (e.g., the column $C_2$ 224) that reflects a baseline mutual capacitance between the sensor elements adjacent to each intersection between the multiple transmit electrodes (e.g., rows $R_0$-$R_{11}$ 230) and the receive electrode (e.g., the column $C_2$ 224). When the touch 220 is present, the sensor signal will be less than the baseline mutual capacitance due to proximity of the input object. In an embodiment, the presence module 320 can detect the presence of the touch 220 relative to column $C_2$ 224 based on this decrease below the baseline mutual capacitance.

The scanning module 310 can repeat this procedure, simultaneously exciting the transmit electrodes (e.g., the rows $R_0$-$R_{11}$ 230) and sequentially or simultaneously receiving sensor signals for the remaining of the receive electrodes (e.g., the columns $C_0$-$C_{11}$ 240). Based on the change in measured signal, the presence module 320 can then determine, as described above, whether an input object is proximate to those receive electrodes.

Each receive electrode (e.g., the columns $C_0$-$C_{11}$ 240) is associated with a position coordinate (e.g., an X-coordinate) along an axis. The position module 330 can determine the position coordinate (e.g., the X-coordinate) of a touch as the position coordinate of the electrode where the peak sensor signal, for example, is observed. Alternatively or additionally, the position module 330 may determine the position coordinate of the touch through finding the centroid of sensor signals distributed over multiple adjacent receive electrodes (e.g., columns $C_1$ 223, $C_2$ 224, and $C_3$ 225). The scanning module 310 can switch the designation of transmit and receive electrodes between the rows $R_0$-$R_{11}$ 230 and the columns $C_0$-$C_{11}$ 240 such that the presence module 320 and position module 330 can detect presence and determine position (e.g., X-Y position) along multiple axes (e.g., in the X-Y plane 215 of FIG. 2).

The scanning module 310 can operate in a balanced scan mode, which is one example of a mutual capacitance axial scan. In an example balanced scan mode, the scanning module 310 simultaneously drives half of the transmit electrodes (e.g., the rows $R_0$-$R_5$) true and the other half (e.g., the rows $R_6$-$R_{11}$) 180-degrees out of phase. When the transmit electrodes are simultaneously excited, the sensor signals on the receive electrode are larger and can more accurately reflect the presence of a touch. When a 1-mm diameter stylus is to be detected, sensor signals that more accurately reflect presence of a touch can be useful. When there is a touch proximate to a transmit-receive electrode intersection, the scanning module 310 can demodulate a received sensor signal to output either a positive or negative current value, depending on whether the touch falls along the transmit electrodes driven with a true excitation signal or the transmit electrodes driven 180-degrees out of phase. If the touch falls (e.g., on a split) between the transmit electrodes driven true and the transmit electrodes driven 180-degrees out of phase, the touch can go undetected. For this reason, the scanning module 310 may provide a second scan in which two split points between true and complement driven transmit electrodes are used to allow detection of a touch not detected through the first scan.

The scanning module 310 may include or utilize a multiplexer or switch matrix (not shown) to distribute excitation signals to one or more selected transmit electrodes where said selected electrodes are a subset of the total set of available transmit electrodes. Likewise, the scanning module 310 may include or utilize the same or a different multiplexer (not shown) to receive current from one or more selected receive electrodes. In this way, the scanning module 310 can scan selected portions or areas (e.g., targeted portions) of the capacitive sensor matrix 205 in an axial scan mode and/or an all points addressable scan mode for presence of an input object.

In an embodiment, the presence module 320 determines whether a measured signal profile indicates the presence of a stylus or a finger. In embodiments, a signal profile includes digitized representations of one or more sensor signals associated with a conductive object proximate to the touch input device 202. Embodiments describing detection of a stylus by the presence module 320 are discussed with respect to FIG. 4. As will be discussed with respect to FIG. 5, if a finger and a stylus are applied to the touch input device 202 at the same time, the presence module 320 can detect, through an axial scan, the presence of the stylus along one axis (e.g., the Y-axis) but may fail to detect the stylus along the other axis (e.g. the X-axis). In an embodiment, if the presence module 320 detects a presence of a stylus in one axis but not the other, the presence module 320 may signal the portion module 340 to define or determine a targeted portion of the touch input device 202 upon which the scanning module 310 should perform another scan operation (e.g., an all points addressable scan or reduced area balanced scan). Defining and scanning targeted portions of the touch input device 202 are described in more detail beginning with the discussion of FIG. 6. The presence module 320 can use the results of the scan of the targeted portion to detect the presence of the stylus on the axis where presence was not detected through the axial scan.

As will be discussed with respect to FIG. 7, if two fingers and a stylus are on the touch input device 202 at the same time, the presence module 320 may fail to detect, through an axial scan, the presence of the stylus along the X-axis and the Y-axis. In an embodiment, if the presence module 320 fails to detect a presence of the stylus along both axes but the stylus was previously detected on the touch input device 202, the presence module 320 may signal the portion module 340 to determine a targeted portion of the touch input device 202 upon which the scanning module 310 should perform another scan operation. The portion module 340 may use a predicted stylus position to determine this targeted portion. The predicted position may be provided by the prediction module 350, which can predict a position of an input object based on, for example, previously determined positions, the direction of movement, velocity, and/or acceleration of a detected presence. For those cases where specific areas or portions of the screen are temporarily masked by the presence of existing touch objects, such as finger touches 708 and 716 in FIG. 7, the prediction module 340 may return an area or targeted portion comprising that masked by these existing touch objects.

When the scan operation performed on the targeted portion is an all points addressable scan, adjusting the gain applied to the corresponding sensor signals can vary the accuracy of detection and location of a touch. The gain adjustment module 360 adjusts the gain of sensor signals. In an embodiment, the gain adjustment module 360 is included within the scanning module 310 and the gain may be adjusted, for example, by reducing the size of an integration capacitor (not shown) during scanning to create a larger ΔV for the same ΔC of charge, by decreasing any attenuation normally enabled to prevent saturation of the integration system when a touch is not present, by integrating for a longer period of time, and/or by increasing the magnitude of the excitation signal, or by any combination of these methods.

In an embodiment, adjusting the gain of a sensor signal affects the signal to noise ratio of the sensor signal. The gain adjustment module 360 may determine an amount to adjust the gain to track a target signal to noise ratio, or to maximize the signal to noise ratio. For example, the gain adjustment module 360 may dynamically measure a signal to noise ratio of sensor signals and then automatically adjust (e.g., increase) the integration time, in order to meet a signal to noise ratio target of an application or user preference.

Figure 4:
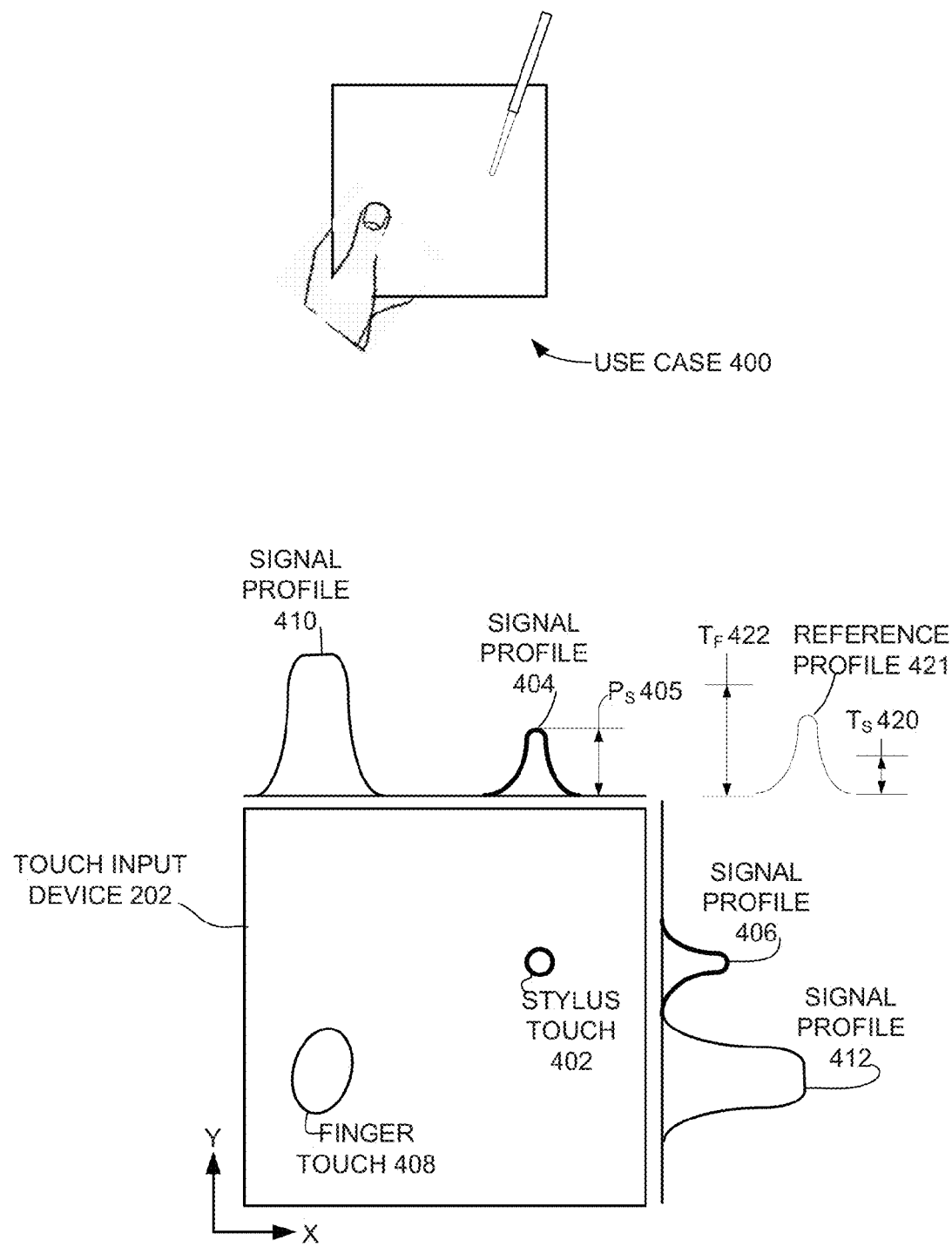
FIG. 4 is a block diagram illustrating a touch input use case and corresponding signal profiles received through an axial scan mode, in accordance with an embodiment.

For some use cases, including the one described with respect to FIG. 4, the sensing module 206 can detect the presence of a stylus in two axes through an axial scan mode. FIG. 4 is a block diagram illustrating a touch input use case 400 and corresponding signal profiles received through an axial scan mode, in accordance with an embodiment.

FIG. 4 includes the stylus touch 402 and the finger touch 408 relative to the touch input device 202. The presence module 320 of FIG. 3 can observe the signal profiles 410 and 412 reflecting the finger touch 408 and the signal profiles 404 and 406 reflecting the stylus touch 402 after the scanning module 310 performs axial scans. To determine whether a signal profile indicates a stylus touch, the presence module 320 may compare the observed signal profiles 404 and 406 with one or more reference signal profiles (e.g., within a range of a reference signal profile) that are representative of a stylus touch. If the presence module 320 determines that an observed signal profile has a level of similarity to a reference signal profile, the presence detector may determine that the observed signal profile indicates a stylus touch. The level of similarity may be selected to suit a performance target such as detection confidence. A reference signal profile 421 may include digitized representations of one or more reference sensor signals. A range of a reference signal profile 421 may include multiple reference signal profiles between upper and lower threshold values. For example, the finger threshold value, $T_F$ 422 may represent the upper threshold value and the stylus threshold value $T_S$ 420 may represent the lower threshold value. Digitized representations of sensor signals between the finger threshold value, $T_F$ 422 and the stylus threshold value $T_S$ 420 can be considered to be within a range of a reference signal profile 421.

With respect to FIG. 4, since the finger touch 408 and the stylus touch 402 are spaced apart on the X-axis and the Y-axis, the signal profiles 410 and 412 of the finger touch 408 do not interfere with or obscure the signal profiles 404 and 406 of the stylus touch 402. Thus, the presence module 320 can observe unobstructed signal profiles 404 and 406 of the stylus touch 402 and correctly detect, through comparison with the reference signal profile 421, the presence of the stylus touch 402 along both the X-axis and the Y-axis.

For example, to detect a presence of a stylus along an axis, the presence module 320 may compare, a minimum peak (e.g., the peak, $P_S$ 405) with the finger threshold value, $T_F$ 422 and the stylus threshold value $T_S$ 420. The finger threshold value, $T_F$ 422 is the decision point between an input object being a stylus or a very small finger. The stylus threshold value $T_S$ 420 is the minimum detection limit of the stylus. In some embodiments the presence module 320 may use hysteresis, touch history, and maximum traveling distance of a touch to improve the reliability and confidence of associations between signal profiles and styli.

Once the presence module 320 has confirmed the presence of the stylus touch 402, the position module 330 can then determine the X-Y coordinates of the stylus touch 402 using either the signal profiles 404 and 406, or if these signals are of insufficient signal to noise ratio from a subsequent targeted scan of the area identified by signal profiles 404 and 406. The presence and location of the finger touch 408 may be ignored or otherwise processed by the sensing module 206 of FIG. 3.

Figure 5:
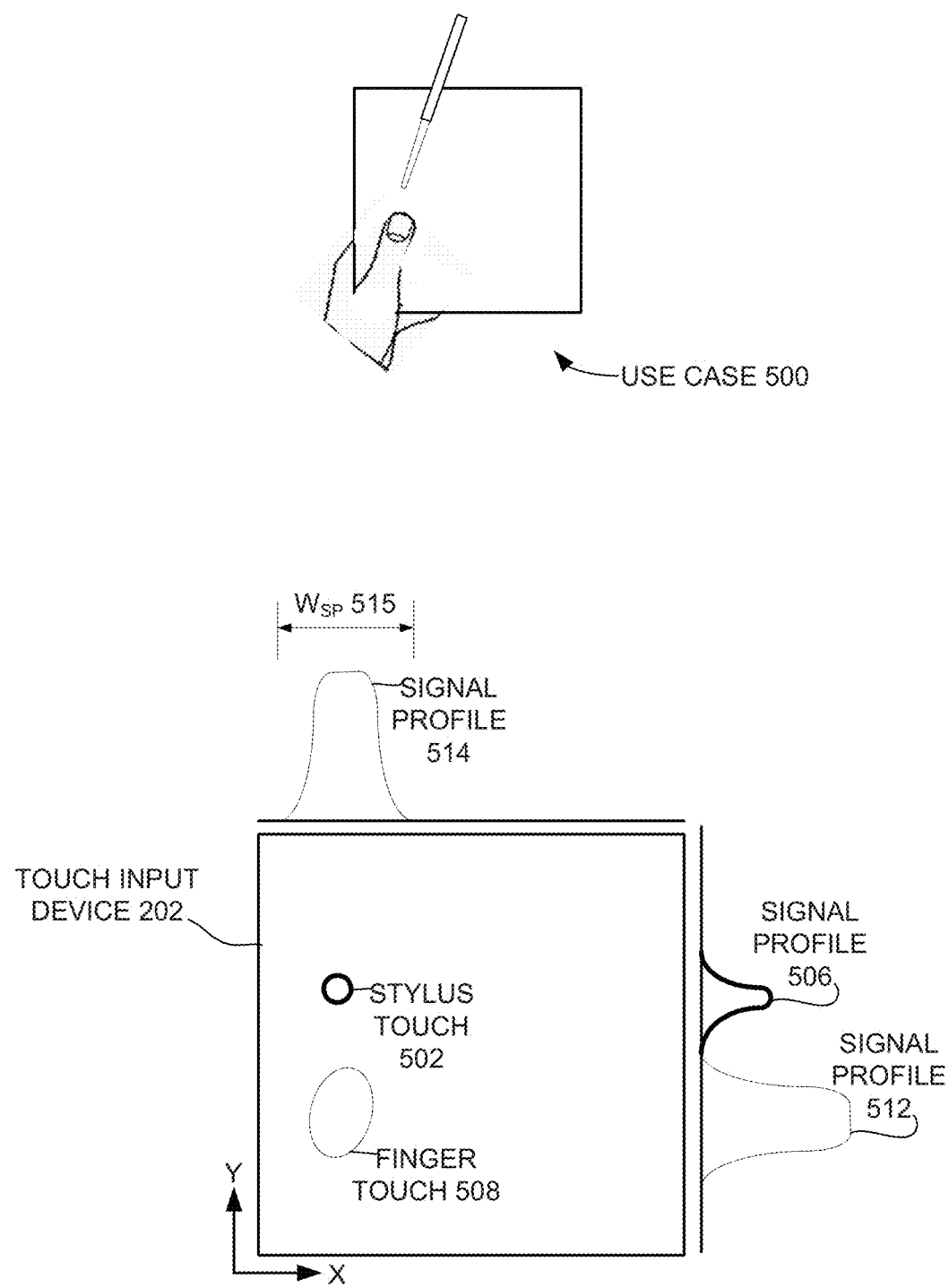
FIG. 5 is a block diagram illustrating another touch input use case and corresponding signal profiles received through an axial scan mode, in accordance with an embodiment.

In the example use case discussed with respect to FIG. 5, it can be difficult to detect, through an axial scan of the full capacitive sensor matrix 205, the presence of a stylus along two axes. FIG. 5 is a block diagram illustrating the touch input use case 500 and corresponding signal profiles obtained through an axial scan, in accordance with an embodiment.

FIG. 5 includes the stylus touch 502 and the finger touch 508 relative to the touch input device 202. After the scanning module 310 performs axial scans of touch sensor electrodes on both X and Y axes, the presence module 320 can observe on the Y-axis the signal profile 512 reflecting the finger touch 508 and the signal profile 506 reflecting the stylus touch 502. Since the finger touch 508 and the stylus touch 502 are not sufficiently spaced apart along the X-axis, the signal profile of the finger touch (not shown) may be combined with the signal profile of the stylus touch (not shown), and as a result, the presence module 320 observes, on the X-axis, the signal profile 514 which reflects both the finger touch 508 and the stylus touch 502 and has a width $W_{SP}$ 515.

In an embodiment, the presence module 320 does not detect the stylus touch 502 on the X-axis because the signal profile 514 does not meet the level of similarity to the reference signal profile of a stylus touch. Since the stylus touch 502 is spaced from the finger touch 508 along the Y-axis, the presence module 320 can detect the presence of the stylus touch 502 on the Y-axis. The position module 330 can then determine a Y-coordinate of the stylus touch 502 through the signal profile 506 (e.g., at the peak of the signal profile).

Figure 6:
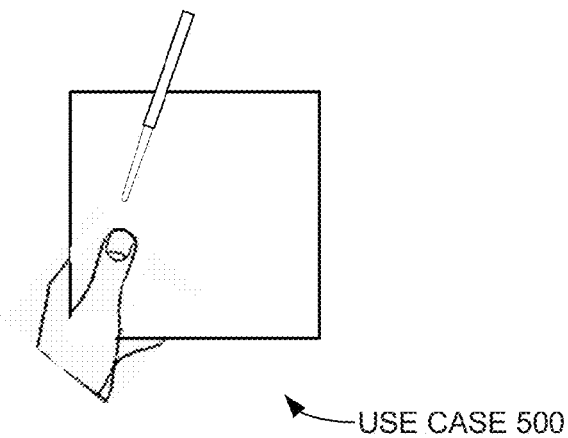
FIG. 6 is a block diagram illustrating the touch input use case of FIG. 4 and a corresponding signal profile obtained through a scan of a portion of the touch input device, in accordance with an embodiment.
Figure 6:
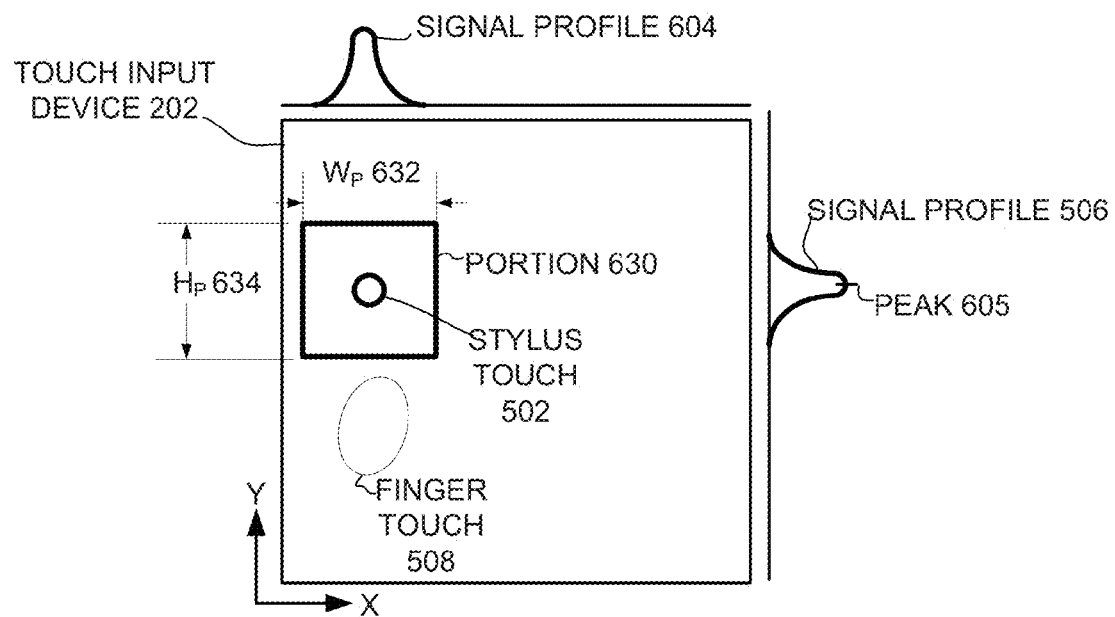

In an embodiment, it is assumed that stylus touch 502 must have an X-coordinate if it has a Y-coordinate. As will now be described with respect to FIG. 6, the scanning module 310 can perform another scan, focused on a portion of the touch input device 202 where the stylus touch 502 is partially known, to determine the missing coordinate of the stylus touch 502. FIG. 6 is a block diagram illustrating the touch input use case 500 of FIG. 5 and a corresponding signal profile 604 received through a scan of a portion 630 of the touch input device 202, in accordance with an embodiment.

FIG. 6 includes the stylus touch 502 and the finger touch 508 and also shows a portion 630 of the touch input device 202 to be scanned for the presence of the stylus touch 502. In an embodiment, the portion module 340 of FIG. 3 sets the width $W_P$ 632 of the portion 630 to be larger than the width $W_{SP}$ 515 of the signal profile 514 in FIG. 5. The height $H_P$ 634 of the portion 630 may be equal in length to the width $W_{SP}$ 515 or another length may be used. The known height of signal profile 506 may be used to set the height $H_P$ 634 of the portion 630 to be scanned. The portion module 340 may center the portion 630, on the X-axis, at the center of the signal profile 514 of FIG. 5 while the portion module 340 may center the portion 630, on the Y-axis, at the determined Y-position (e.g., at the peak 605) of the stylus touch 502. It will be noted that the portion 630 may be a shape other than a square without departing from the claimed subject matter.

Once the portion module 340 has defined the portion 630 and its location, the scanning module 310 can proceed with a mutual capacitance scan within the portion 630, which can result in the signal profile 604 along the X-axis. The mutual capacitance scan of the portion 630 may be an all points addressable mutual capacitance scan of the intersections within the portion 630. By driving the transmit electrodes that pass through the portion 630 instead of all of the transmit electrodes, as done in a full panel axial scan, the location (e.g., an X-coordinate) of the stylus touch 502 can be identified even when the finger touch 508 is present on the touch input device 202.

Alternatively or additionally, the mutual capacitance scan may be a second axial scan (e.g., a balanced mutual capacitance measurement), in which the scanning module 310 drives the transmit electrodes that pass through the area under the finger touch 508 to a virtual ground, rather than with the excitation signal. Alternatively or additionally, the mutual capacitance scan may be a less than full panel balanced scan centered on the identified Y-axis coordinate (e.g., using ++−− and +−−+ or similar balanced or near-balanced patterns driven onto the transmit electrodes) or an unbalanced scan centered on the Y-axis coordinate (e.g., using a ++ pattern driven onto the transmit electrodes).

Under some conditions, scanning a finger touch for too long or at too large of a transmit excitation signal amplitude, such as would be done to improve sensitivity to small touch objects, can result in sensor signals that because of their size are difficult to measure. However, since a stylus touch may result in a relatively small sensor signal, the mutual capacitance scan of a targeted portion can include increased gain to accurately detect and locate the stylus. The gain adjustment module 360 can tune the results of the mutual capacitance scan of a targeted portion to optimize report rate speed or accuracy of touch position calculation. For example, the resulting sensor signals may be tuned to optimize detection of a fast moving input object or a small input object (e.g., a 1-mm stylus). In an embodiment, the gain adjustment module 360 can search for the optimum gain settings to achieve a maximum signal to noise ratio at the target report rate. The gain adjustment module 360 may also adjust gain (e.g., through increasing integration time) on the scanning result to increase the signal to noise ratio until enough resolution is gained to determine a reliable position of the stylus.

Figure 7:
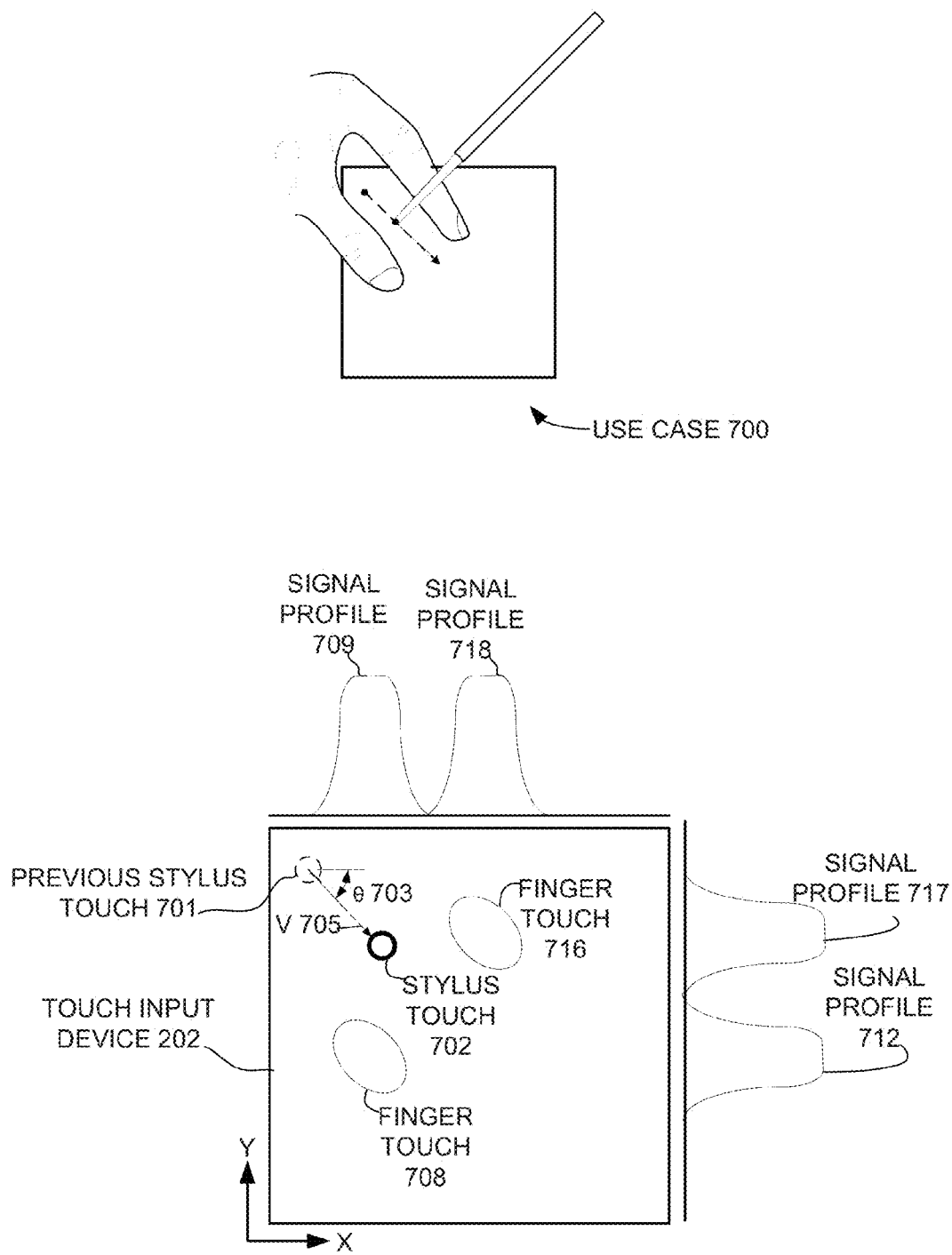
FIG. 7 is a block diagram illustrating yet another touch input use case and corresponding signal profiles obtained through an axial scan mode, in accordance with an embodiment.

FIG. 7 is a block diagram illustrating yet another touch input use case 700 and corresponding signal profiles obtained through an axial scan, in accordance with an embodiment. In the example use case discussed with respect to FIG. 7, it can be difficult to detect, through an axial scan of the full capacitive sensor matrix 205, a presence of the stylus along either the X-axis or the Y-axis.

FIG. 7 includes the stylus touch 702 and the finger touches 708 and 716 relative to the touch input device 202. A previous stylus touch 701 is shown that was previously detected by the presence module 320 and who's location was determined by the position module 330. The angle, θ 703 and velocity of motion, V 705 between the previously detected stylus touch 701 and the stylus touch 702 are also shown. After the scanning module 310 performs axial scans, the presence module 320 can observe along the X-axis, the signal profiles 709 and 718, and can observe along the Y-axis, the signal profiles 712 and 717. Since the finger touches 708, 716, and the stylus touch 702 are not sufficiently spaced apart along the X-axis and the Y-axis, the signal profiles of the finger touches 708 and 716 (not shown) interfere with observation of the signal profile (not shown) of the stylus touch 702 along both the X-axis and the Y-axis. In an embodiment, the presence module 320 does not detect the stylus touch 702 in the X-axis or the Y-axis because none of the signal profiles 709, 718, 717, and 712 meet a level of similarity to the reference signal profile of a stylus touch.

In the touch input use case 700, the presence module 320 may use detection history and/or position prediction to determine a targeted portion of the touch input device 202 to scan for the stylus touch 702. The presence module 320 may determine that a targeted scan should be performed if a stylus was previously detected but is not detected after the finger touches 708 and 716 are detected or moved. Similarly, if the sensing system 100 is configured for or operating in a mode where the presence of a stylus is expected, e.g., a drawing application, the presence module 320 may use the absence of detection of a stylus presence in an initial full-panel axial scan to direct the portion module 340 to determine a targeted portion of the touch input device 202 to scan for the stylus touch 702, specifically that area of the touch input device 202 masked by the known signal profiles 709, 712, 717, and 718. Examples of the use of detection history and position prediction to define the portion to be scanned are discussed with respect to FIG. 8.

Figure 8:
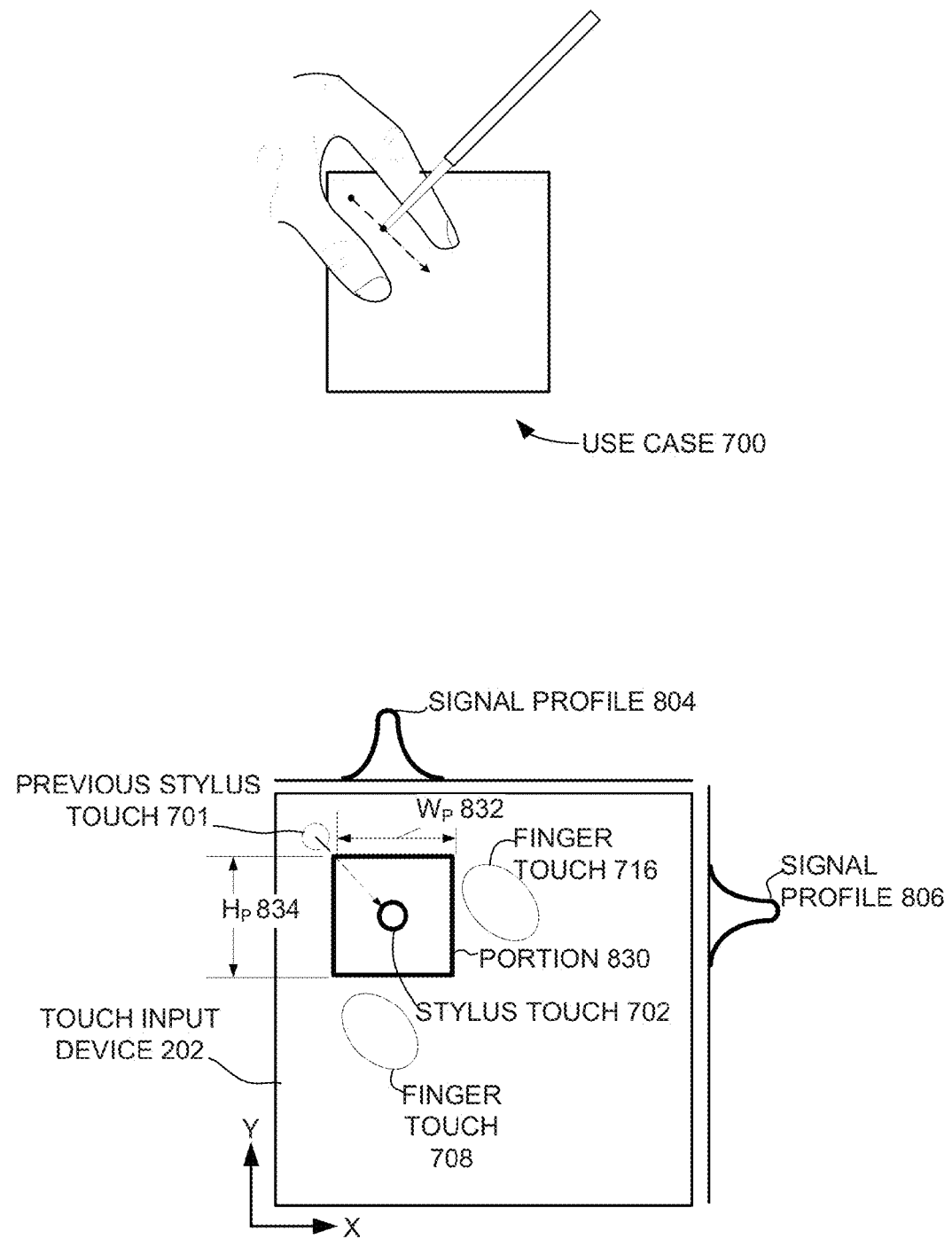
FIG. 8 is a block diagram illustrating the touch input use case of FIG. 7 and corresponding signal profiles obtained through a scan of a portion of the touch input device, in accordance with an embodiment.

FIG. 8 is a block diagram illustrating the touch input use case 700 of FIG. 7 and corresponding signal profiles 804 and

806 obtained through a scan of a portion 830 of the touch input device 202, in accordance with an embodiment. FIG. 8 includes the stylus touch 702 and the finger touches 708 and 716. FIG. 8. also shows a portion 830 of the touch input device 202 to be scanned for the presence of the stylus at stylus touch location 702.

In various embodiments, the portion module 340 determines the location of the portion 830 to be scanned based on the location of one or more previously detected stylus and finger touches. For example, the presence module 320 may access a detection history stored in the memory 370 of FIG. 3 to determine that a stylus touch was previously detected at a location (e.g., the same location as the stylus touch 702) that is not spaced apart in the X-axis and the Y-axis from the finger touches 708 and 716. The portion module 340 may position the portion 830 to be scanned such that the portion 830 is centered on the position of the previously detected and resolved touch location. In an embodiment the portion module 340 may set the width, $W_P$ 832 of the portion 830 to be greater that the width of the signal profile 709 of FIG. 7 and set the height, $H_P$ 834 of the portion to be greater than or equal to the width of the signal profile 717 of FIG. 7.

In another embodiment, the prediction module 350 may predict a next position of a moving stylus and the position module 330 may determine the position of the portion 830 based on the predicted position. In an embodiment, the prediction module 350 predicts the position of the stylus based on factors such as the location of the previous stylus touch 701, direction and velocity of stylus movement (e.g., the angle, $\theta$ 703 and velocity V 705 of FIG. 7), and/or the acceleration of stylus movement. The prediction module 350 may access and/or calculate these factors through a touch location history stored in the memory 370 of FIG. 3. The portion module 340 may center the portion 830 on the predicted position (e.g., the same position as the stylus touch 702) and define the width, $W_P$ 832, and height $H_P$ 834 of the portion 830 to account for a level of uncertainty in the predicted position.

Once the portion module 340 has determined the portion 830 to be scanned, the scanning module 310 can proceed with one or more of the mutual capacitance scan operations described above or with another type of scan operation that can detect the presence of the stylus touch 702 and permit resolution of its location. In an embodiment, the scan of the portion 830 results in the signal profiles 804 and 806 along the X-axis and the Y-axis, respectively.

Figure 9:
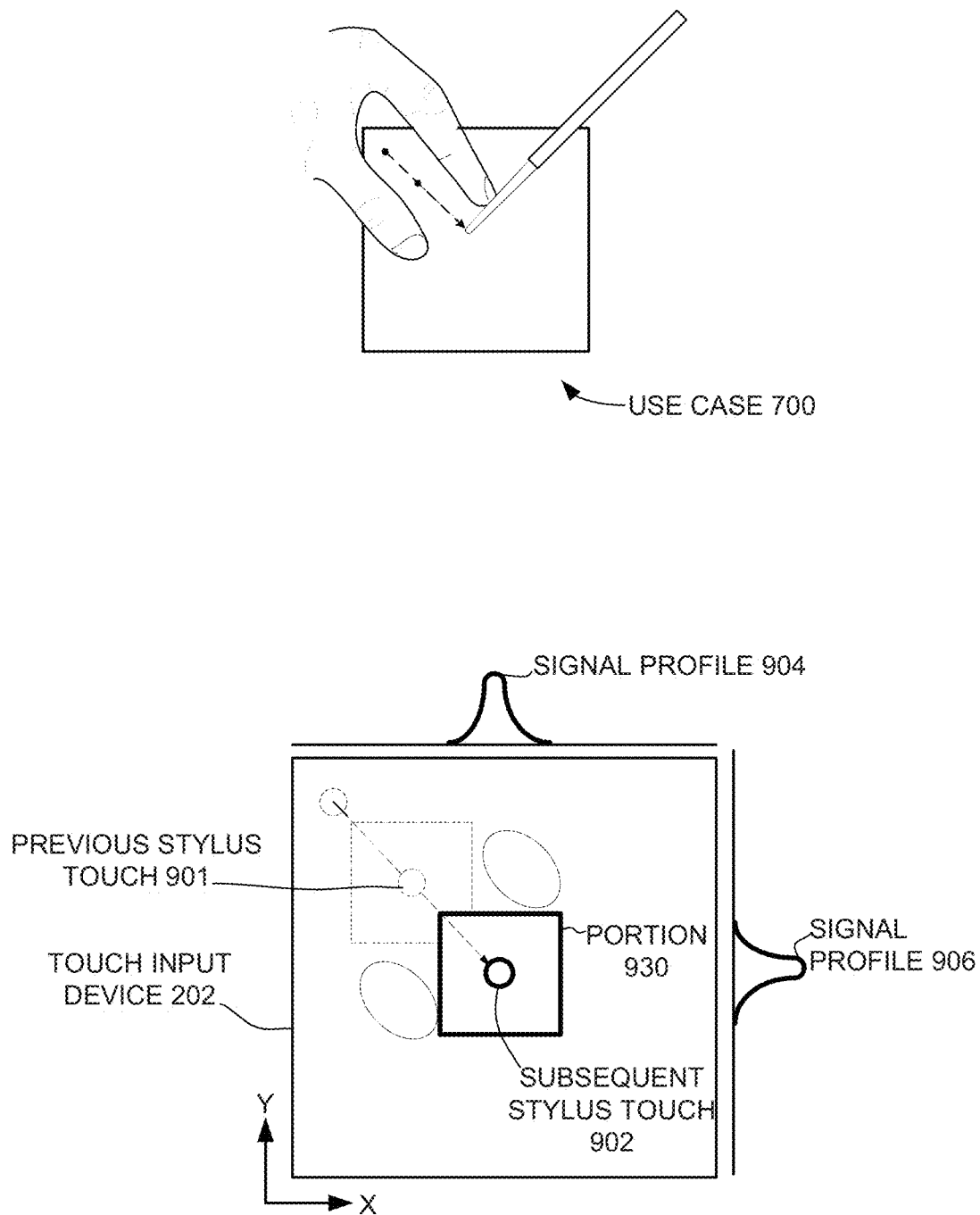
FIG. 9 is a block diagram illustrating the touch input use case of FIG. 7 and corresponding signal profiles obtained through a scan of another portion of the touch input device, in accordance with an embodiment.

Once the position module 330 has resolved the X-Y position of the stylus touch 702 using the signal profiles 804 and 806, position prediction can be used to track subsequent positions of the stylus, as will be described with respect to FIG. 9. FIG. 9 is a block diagram illustrating the touch input use case 700 of FIG. 7 and corresponding signal profiles 904 and 906 obtained through a scan of a another portion 930 of the touch input device 202, in accordance with an embodiment.

FIG. 9 includes a previous stylus touch 901 (e.g., previously detected), a subsequent stylus touch 902 (e.g. to be subsequently detected), and also shows the portion 930 of the touch input device 202 to be scanned for detection and resolution of location of the subsequent stylus touch. If it is assumed that a single stylus is present, once the location of the previous stylus touch 901 has been determined, tracking of the stylus may be provided through scanning the portion 930 surrounding a predicted position of the subsequent stylus touch 902, and without a full axial scan of the touch input device 202. In this way, the problem of interfering or obstructing finger touch signals associated with axial scans can be avoided.

In an embodiment, one or more positions of previous detected stylus touches (e.g., the previously detected stylus touch 702) are stored in a memory such as a circular buffer, and used by the prediction module 350 to predict the approximate position of the subsequent stylus touch 902 based on factors such as the previous position, the direction, the velocity and/or the acceleration of the stylus touch. The portion 930 to be scanned can be centered and sized around the predicted position as described above with respect to FIG. 8. Each time a new position is determined through scanning a targeted portion, the oldest location in the buffer may be discarded or over-written by the newly determined position. In this way, the approximate next location of the stylus can be predicted, and a high sensitivity local scan can be performed around the predicted location of the stylus allowing the position module 330 to determine the stylus location.

Figure 10:
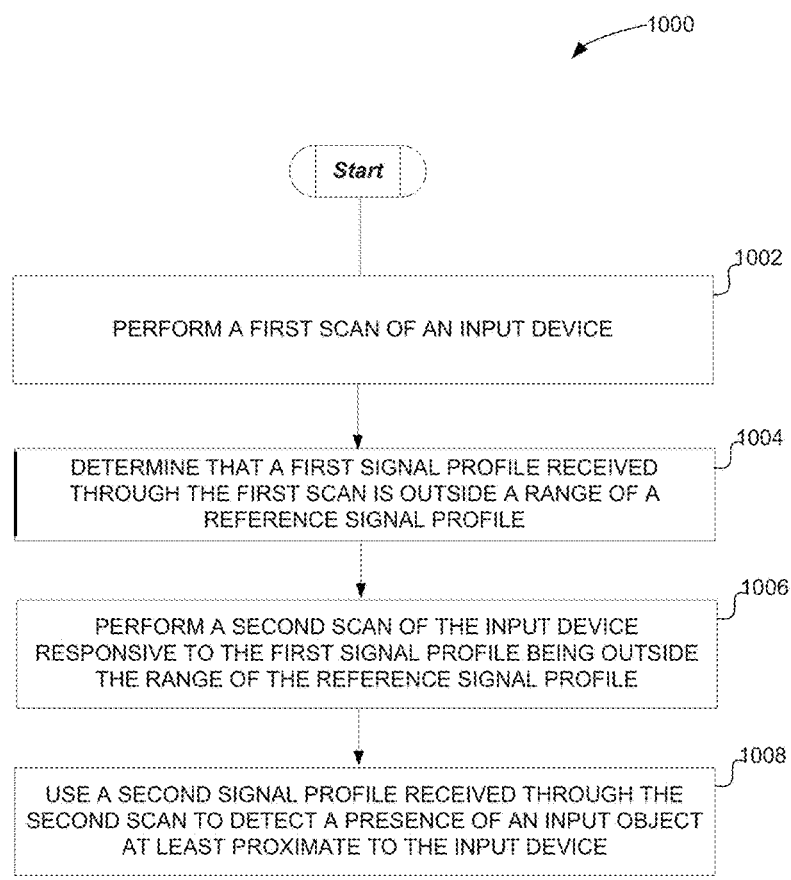
FIG. 10 is a flow diagram illustrating a method or detecting a presence of an input object, in accordance with an embodiment.

FIG. 10 is a flow diagram illustrating a method 1000 for detecting a presence of an input object and resolving its location, in accordance with an embodiment. A description of the method 1000 refers to components of drawings referred to above for the purpose of explanation and not to limit the claimed subject matter. It will be noted that the methods described herein may be performed by hardware, software, or a combination of hardware and software.

At block 1002, the method 1000 may include the scanning module 310 of FIG. 3 performing a first scan of an input device. At block 1004, the method 1000 may include the presence module 320 of FIG. 3 determining that a first signal profile (e.g., the signal profile 514 of FIG. 5) received through the first scan is outside of a range of a reference signal profile (e.g., the finger threshold $T_F$ 422 and the stylus threshold $T_S$ 420 of FIG. 4).

At block 1006, the method 1000 may include the scanning module 310 performing a second scan of the touch input device 202 in response to the first signal profile being outside of the range of the reference signal profile. In an embodiment, the first scan includes an axial scan and the second scan includes an all points addressable scan of a portion (e.g., the portion 630 of FIG. 6) of the touch input device 202 determined by the portion module 340 of FIG. 3. In various embodiments, the portion module 340 determines the area or portion of the touch input device 202 to be scanned using one or more of a dimension of the first signal profile, the position of a previously detected presence, a predicted position of the input object, and an area masked by the measured signal profiles. Alternatively or additionally, the scanning module 310 may excite a first number of transmit electrodes in the first scan and excite a second, fewer number of transmit electrodes in the second scan.

At block 1008, the method 1000 may include the presence module 320 using a second signal profile (e.g., the signal profile 604 of FIG. 6) received through the second scan to detect a presence and resolve the location of an input object at least proximate to the input device. In an embodiment, the gain adjustment module 360 automatically adjusts a gain on sensors signals to meet a target signal to noise ratio value for the second signal profile. Using the signal profile, the position module 330 may then determine a coordinate position of the detected presence on an axis of the input device.

Alternatively or additionally to the first scan being an axial scan (e.g., of the full touch input device 202 or panel), the scanning module 310 may perform a first pass all points addressable scan of the touch input device 202 at sensitivities used to detect and track fingers, standard touches, and other relatively large input objects (e.g., large relative to a 1-mm diameter stylus). Once the position module 330 determines the locations of those touches, the sensitivity of the sensing module 106 when measuring the receive electrodes for the intersections having known touches may be decreased, to prevent saturation, while the sensitivity of the sensing module 106 when measuring the same receive electrodes may be increased sufficiently to detect presence of a relatively small stylus, when measuring the remaining areas of the touch input device 202. For example, the size of the capacitor used to integrate charge coupled onto each receive electrode can be made smaller to increase sensitivity, or made larger to decrease sensitivity. In another example, a programmable gain amplifier, provided for example in the sensing module 106, can be programmed to increase gain for intersections where a finger touch was not previously detected, while simultaneously decreasing gain for those intersections where a finger touch was already found (e.g., in the first pass scan).

Figure 11:
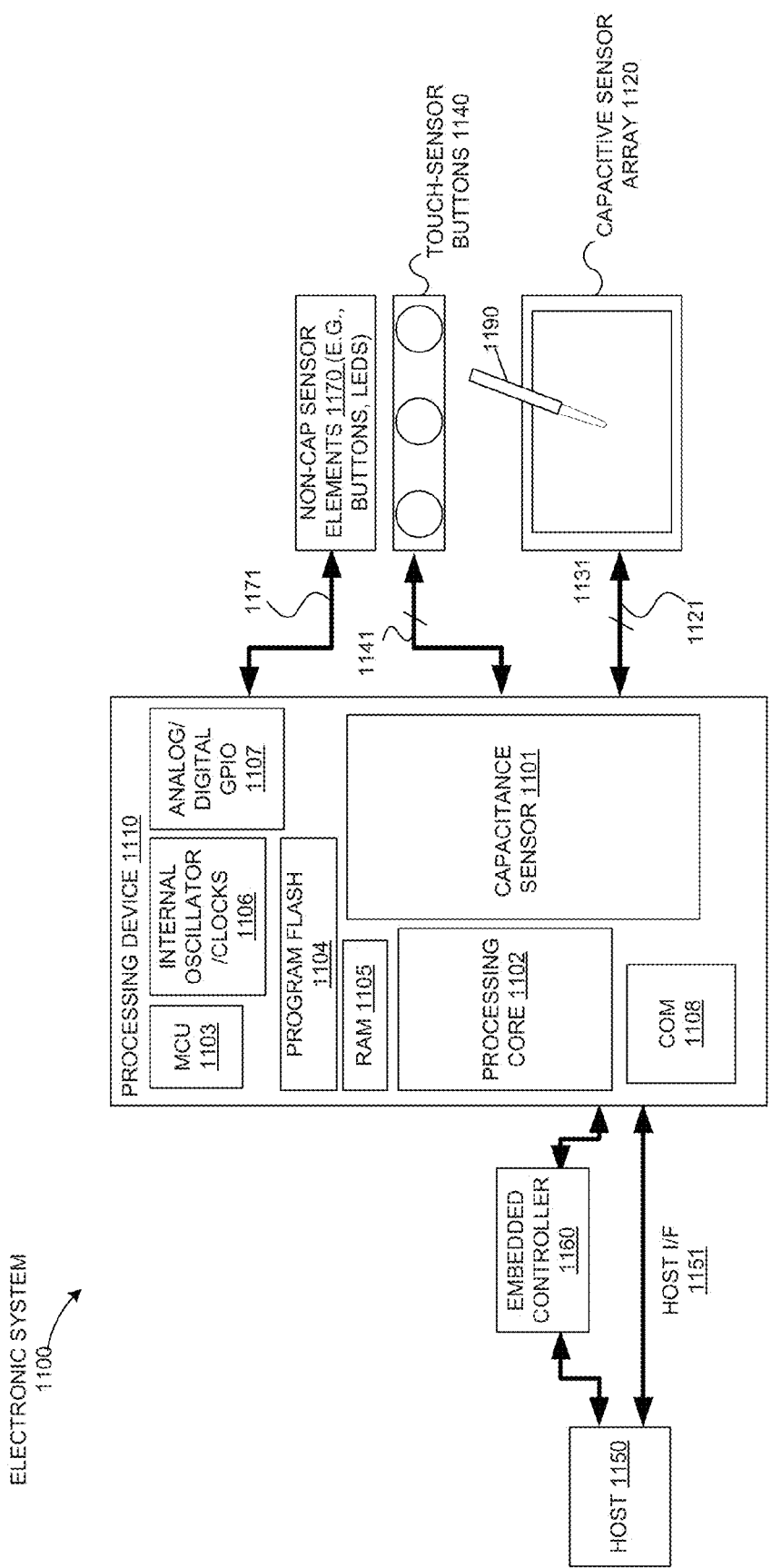
FIG. 11 is a block diagram illustrating an electronic system to detect a presence of a conductive object on a capacitive sensor array, in accordance with various embodiments.

FIG. 11 is a block diagram illustrating an electronic system 1100 to detect a presence of a conductive object on a capacitive sensor array 1120, in accordance with various embodiments. The electronic system 1100 includes a processing device 1110, the capacitive sensor array 1120, touch-sensor buttons 1140, host processor 1150, embedded controller 1160, and non-capacitance sensor elements 1170. The processing device 1110 may include analog and/or digital general purpose input/output ("GPIO") ports 1107. GPIO ports 1107 may be programmable.

The digital block array may be configured to implement a variety of digital logic circuits (e.g., DACs, digital filters, or digital control systems) using, in one embodiment, configurable user modules ("UMs"). The digital block array may be coupled to a system bus. Processing device 1110 may also include memory, such as random access memory ("RAM") 1105 and program flash 1104. RAM 1105 may be static RAM ("SRAM"), and program flash 1104 may be a non-volatile storage, which may be used to store firmware (e.g., control algorithms executable by processing core 1102 to implement operations described herein). The memory may include instructions that when executed perform the method described herein. Processing device 1110 may also include a microcontroller unit ("MCU") 1103 coupled to memory and the processing core 1102.

As illustrated, capacitance sensor 1101 may be integrated into processing device 1110. Capacitance sensor 1101 may include analog I/O for coupling to an external component, such as capacitive sensor array 1120, touch-sensor buttons 1140, and/or other devices. Capacitance sensor 1101 and processing device 1110 are described in more detail below.

The embodiments described herein can be used in any capacitive sensor array application, for example, the capacitive sensor array 1120 may be a touch screen, a touch-sensor slider, or touch-sensor buttons 1140 (e.g., capacitance sensor buttons). The operations described herein may include, but not be limited to, notebook pointer operations, lighting control (dimmer), volume control, graphic equalizer control, speed control, or other control operations requiring gradual or discrete adjustments. It will also be noted that these embodiments of capacitive sense implementations may be used in conjunction with non-capacitive sensor elements 1170, including but not limited to pick buttons, sliders (ex. display brightness and contrast), scroll-wheels, multi-media control (e.g., volume, track advance) handwriting recognition, and numeric keypad operation.

In one embodiment, the electronic system 1100 includes a capacitive sensor array 1120 of sensor elements coupled to the processing device 1110 via bus 1121. In an embodiment, the capacitive sensor array may include sensor elements 204 of FIG. 2. The capacitive sensor array 1120 of the sensor elements may include a one-dimensional sensor array in one embodiment and a two dimensional sensor array in another embodiment. Alternatively or additionally, the capacitive sensor array 1120 of the sensor elements may have more dimensions. The capacitive sensor array 1120 may employ projected capacitive technology in which the capacitive sensor elements of the capacitive sensor array are formed in one or more capacitive sensor layers upon a substrate (not shown) of the capacitive sensor array 1120. For example, the capacitive sensor elements may be patterned over an image display (e.g., a liquid crystal display) in one or more layers of transparent conducting film deposited on a glass substrate. A protective transparent layer (e.g., glass or plastic film) may cover the capacitive sensor elements to shield them from environmental damage.

Also, in one embodiment, the capacitive sensor array 1120 of the sensor elements may be sliders, touchpads, touch screens, or other sensing devices. In another embodiment, the electronic system 1100 includes touch-sensor buttons 1140 coupled to the processing device 1110 via bus 1141. Touch-sensor buttons 1140 may include a single-dimension or multi-dimension sensor array. The single- or multi-dimension sensor array may include multiple sensor elements. For a touch-sensor button, the sensor elements may be coupled together to detect a presence of a conductive object over the entire surface of the sense device. Alternatively, the touch-sensor buttons 1140 may have a single sensor element to detect the presence of the conductive object. In one embodiment, touch-sensor buttons 1140 may include a capacitive sensor element. Capacitive sensor elements may be used as non-contact sensor elements. These sensor elements, when protected by an insulating layer, offer resistance to severe environments.

The electronic system 1100 may include any combination of one or more of the capacitive sensor array 1120, and/or touch-sensor button 1140. In another embodiment, the electronic system 1100 may also include non-capacitance sensor elements 1170 coupled to the processing device 1110 via bus 1171. The non-capacitance sensor elements 1170 may include buttons, light emitting diodes ("LEDs"), information displays (e.g., LCD, AMOLED) and other user interface devices, such as a mouse, a keyboard, or other functional keys that do not require capacitance sensing. In one embodiment, busses 1171, 1141, 1131, and 1121 may be a single bus. Alternatively, these buses may be configured into any combination of one or more separate buses.

Processing device 1110 may include internal oscillator/clocks 1106 and communication block ("COM") 1108. The oscillator/clocks block 1106 provides clock signals to one or more of the components of processing device 1110. Communication block 1108 may be used to communicate with an external component, such as a host processor 1150, via host interface ("I/F") line 1151. Alternatively, processing device 1110 may also be coupled to the embedded controller 1160 to communicate with the external components, such as host processor 1150. In one embodiment, the processing device 1110 is configured to communicate with the embedded controller 1160 or the host processor 1150 to send and/or receive data. In one embodiment the processing device 1110 contains all the functionality of the host 1150 such that host interface line 1151 is not present.

Processing device 1110 may reside on a common carrier substrate such as, for example, an integrated circuit ("IC") die substrate, a multi-chip module substrate, or the like. Alternatively, the components of processing device 1110 may be one or more separate integrated circuits and/or discrete components. In one exemplary embodiment, processing device 1110 may be the Programmable System on a Chip ("PSoC®") processing device, developed by Cypress Semiconductor Corporation, San Jose, Calif. Alternatively, processing device 1110 may be one or more other processing devices known by those of ordinary skill in the art, such as a microprocessor or central processing unit, a controller, special-purpose processor, digital signal processor ("DSP"), an application specific integrated circuit ("ASIC"), a field programmable gate array ("FPGA"), or the like.

It will also be noted that the embodiments described herein are not limited to having a configuration of a processing device coupled to the host processor 1150, but may include a system that measures the capacitance on the sense device and sends the raw data to another host computer where it is analyzed by an application. In effect, the processing that is done by processing device 1110 may also be done in the host computer.

It is noted that the processing device 1110 of FIG. 11 may measure capacitance using various techniques, such as self-capacitance sensing and mutual capacitance sensing. The self-capacitance sensing mode is also called single-electrode sensing mode, as each sensor element needs only one connection wire to the sensing circuit. For the self-capacitance sensing mode, touching the sensor element increases the sensor capacitance as the finger touch capacitance is added to the sensor capacitance. The mutual capacitance change is detected in the mutual capacitance-sensing mode, wherein each sensor element uses at least two electrodes: one is a transmitter (TX) electrode (also referred to herein as transmitter electrode) and the other is a receiver (RX) electrode. When a finger touches a sensor element or is in close proximity to the sensor element, the capacitive coupling between the receiver and the transmitter of the sensor element is decreased as the finger shunts part of the electric field to ground (e.g., chassis or earth). A stylus 1190 used to provide input to the capacitive sensor array 1120 may be active or passive. In some embodiments, the processing device 1110 may provide multi-touch capability through simultaneously detecting multiple conductive objects proximate to different regions of the capacitive sensor array 1120. In an embodiment, the processing device 1110 may include and/or provide the functionality of one or more of the scanning module 310, a gain adjustment module 360, a presence module 320, a position module 330, a portion module 340, and a prediction module 350 as described with respect to the figures above.

Capacitance sensor 1101 may be integrated into the IC of the processing device 1110, or alternatively, in a separate IC. The capacitance sensor 1101 may include relaxation oscillator (RO) circuitry, a sigma delta modulator (also referred to as CSD) circuitry, charge transfer circuitry, charge accumulation circuitry, or the like, for measuring capacitance as would be appreciated by one of ordinary skill in the art having the benefit of this disclosure. Alternatively, descriptions of capacitance sensor 1101 may be generated and compiled for incorporation into other integrated circuits. For example, behavioral level code describing capacitance sensor 1101, or portions thereof, may be generated using a hardware descriptive language, such as VHDL or Verilog, and stored to a machine-accessible medium (e.g., CD-ROM, hard disk, floppy disk, etc.). Furthermore, the behavioral level code can be compiled into register transfer level ("RTL") code, a netlist, or even a circuit layout and stored to a machine-accessible medium. The behavioral level code, the RTL code, the netlist, and the circuit layout all represent various levels of abstraction to describe capacitance sensor 1101. It will be noted that the components of the electronic system 1100 may include only some or all the discrete components described above, or some combination thereof.

In one embodiment, electronic system 1100 is used in a notebook computer. Alternatively, the electronic device may be used in other applications, such as a mobile handset, a personal data assistant ("PDA"), a keyboard, a television, a remote control, a monitor, a handheld multi-media device, a handheld video player, a handheld gaming device, or a control panel.

The above description is intended to be illustrative, and not restrictive. For example, the above-described embodiments (or one or more aspects thereof) may be used in combination with each other. Other embodiments will be apparent to those of skill in the art upon reviewing the above description. The scope of the claims should, therefore, be determined with reference to the appended claims, along with the full scope of equivalents to which such claims are entitled. In the appended claims, the terms "including" and "in which" are used as the plain-English equivalents of the respective terms "comprising" and "wherein." Also, in the following claims, the terms "including" and "comprising" are open-ended; a system, device, article, or process that includes elements in addition to those listed after such a term in a claim are still deemed to fall within the scope of that claim. Moreover, in the following claims, the terms "first," "second," and "third," etc. are used merely as labels and are not intended to impose numerical requirements on their objects.

In this document, the terms "a" or "an" are used, as is common in patent documents, to include one or more than one. In this document, the term "or" is used to refer to a nonexclusive or, such that "A or B" includes "A but not B," "B but not A," and "A and B," unless otherwise indicated. In the event of inconsistent usages between this document and those documents so incorporated by reference, the usage in the incorporated reference(s) should be considered supplementary to that of this document; for irreconcilable inconsistencies, the usage in this document supersedes the usage in any incorporated references.

Although the claimed subject matter has been described with reference to specific embodiments, it will be evident that various modifications and changes may be made to these embodiments without departing from the broader spirit and scope of what is claimed. Accordingly, the specification and drawings are to be regarded in an illustrative rather than a restrictive sense.

The Abstract of the Disclosure is provided to comply with 37 C.F.R. §1.72(b), requiring an abstract that will allow the reader to quickly ascertain the nature of the technical disclosure. It is submitted with the understanding that it will not be used to interpret or limit the scope or meaning of the claims.

What is claimed is:

1. A method comprising:
   detecting a presence of an input object proximate to a second electrode associated with a second axis of an input device and not detecting the presence of the input object proximate to a first electrode associated with a first axis of the input device, comprising:
   performing a first scan of the input device, wherein the first scan includes receiving first sensor signals from a plurality of electrodes;
   determining that a first signal profile that is based on the first sensor signals is outside of a range of a reference signal profile, wherein signal profiles determined to be within the range of the reference signal profile indicate presence of an input object;
   performing a second scan of the input device responsive to the first signal profile being outside of the range of the reference signal profile, and the detecting the presence of the input object proximate to the second electrode, wherein the second scan includes receiving second sensor signals from another pluraltiy of electrodes; and using the second sensor signals to detect the presence of the input object at least proximate to the first electrode.

2. The method of claim 1, further comprising determining a portion of the input device upon which to perform the second scan, based on a dimension of the first signal profile.

3. The method of claim 1, further comprising determining a portion of the input device upon which to perform the second scan, based on a position of a previously detected presence of the input object.

4. The method of claim 3, wherein determining the portion based on the position of the previously detected presence of the input object includes predicting a position of the input object, wherein the predicted position is based on the position of the previously detected presence of the input object and a velocity of the input object, wherein the determined portion includes the predicted position.

5. The method of claim 1, wherein the performing of the first scan includes performing an axial scan and the performing of the second scan includes performing an all points addressable scan, wherein the input object is a stylus.

6. The method of claim 1, further comprising adjusting a gain of the second scan.

7. The method of claim 1, wherein the plurality of electrodes and the another plurality of electrodes have at least one electrode in common.

8. An apparatus comprising:
a scanning module configured to perform a first scan of an input device, wherein the first scan includes receiving first sensor signals from a plurality of electrodes; and
a presence module coupled to the scanning module, the presence module configured to detect whether an input object is proximate to a first electrode associated with a first axis of the input device and a second electrode associated with a second axis of the input device, the presence module configured to determine that a first signal profile that is based on the first sensor signals is not within a range of a reference signal profile stored in a memory, wherein the scanning module is configured to perform a second scan of the input device responsive to the determination that the first signal profile is not within the range of the reference signal profile and a detection that the input object is proximate to the second electrode associated with the second axis of the input device, wherein the second scan includes receiving second sensor signals from another plurality of electrodes, and the presence module is configured to use the second sensor signals to detect that the input object is at least proximate to the first electrode associated with the first axis of the input device.

9. The apparatus of claim 8, further comprising a portion module coupled to the scanning module, the portion module configured to determine a portion of the input device upon which the scanning module is to perform the second scan, based on a dimension of the first signal profile.

10. The apparatus of claim 8, further comprising a portion module coupled to the scanning module, the portion module configured to determine a portion of the input device upon which the scanning module is to perform the second scan, based on a position of a previously detected presence of the input object.

11. The apparatus of claim 10, further comprising a prediction module coupled to the portion module, the prediction module configured to predict a position of the input object, wherein the predicted position is based on the position of the previously detected presence of the input object and a velocity of the input object, wherein the determined portion includes the predicted position.

12. The apparatus of claim 8, wherein the scanning module is configured to excite a first number of transmit electrodes in the first scan and excite a second number of transmit electrodes in the second scan, wherein the second number of transmit electrodes is less than the first number of transmit electrodes.

13. The apparatus of claim 8, further comprising a gain adjustment module coupled to the scanning module, the gain adjustment module configured to adjust a gain of the second scan to meet a target signal to noise ratio value for the second signal profile.

14. The apparatus of claim 8, wherein the plurality of electrodes and the another plurality of electrodes have at least one electrode in common.

15. A sensing system comprising:
a processing device; and
a touch input device coupled with the processing device, the processing device comprising:
a scanning module configured to perform a first scan of the touch input device and a second scan of the touch input device, wherein the first scan includes receiving first sensor signals from a plurality of electrodes, and the second scan includes receiving second sensor signals from another plurality of electrodes; and
a presence module coupled to the scanning module, the presence module configured to detect whether an input object is proximate to a first electrode associated with a first axis of the input device and a second electrode associated with a second axis of the input device, the presence module configured to determine that a first signal profile, which is based on the first sensor signals, is not within a range of a reference signal profile stored in a memory, wherein the scanning module is configured to perform the second scan of the touch input device responsive to the determination that the first signal profile is not within the range of the reference signal profile and a detection that the input object is proximate to the second electrode associated with the second axis of the touch input device, and the presence module is configured to detect that the input object is at least proximate to the first electrode associated with the first axis of the touch input device, based on the second sensor signals.

16. The system of claim 15, further comprising a portion module coupled to the scanning module, the portion module configured to determine a portion of the touch input device upon which the scanning module is to perform the second scan, based on a dimension of the first signal profile.

17. The system of claim 15, further comprising a portion module coupled to the scanning module, the portion module configured to determine a portion of the touch input device upon which the scanning module is to perform the second scan, based on a position of a previously detected presence of the input object.

18. The apparatus of claim 17, further comprising a prediction module coupled to the portion module, the prediction module configured to predict a position of the detected presence, wherein the predicted position is based on the position of the previously detected presence of the input object and a velocity of the input object, wherein the determined portion includes the predicted position.

19. The system of claim 15, wherein the scanning module is configured to perform an axial scan as the first scan and an all points addressable scan as the second scan.

20. The system of claim 15, wherein the plurality of electrodes and the another plurality of electrodes have at least one electrode in common.

* * * * *